Sept. 24, 1968  L. D. MASSER  3,402,792
BRAKE ACTUATING APPARATUS
Filed Jan. 3, 1967  2 Sheets-Sheet 2

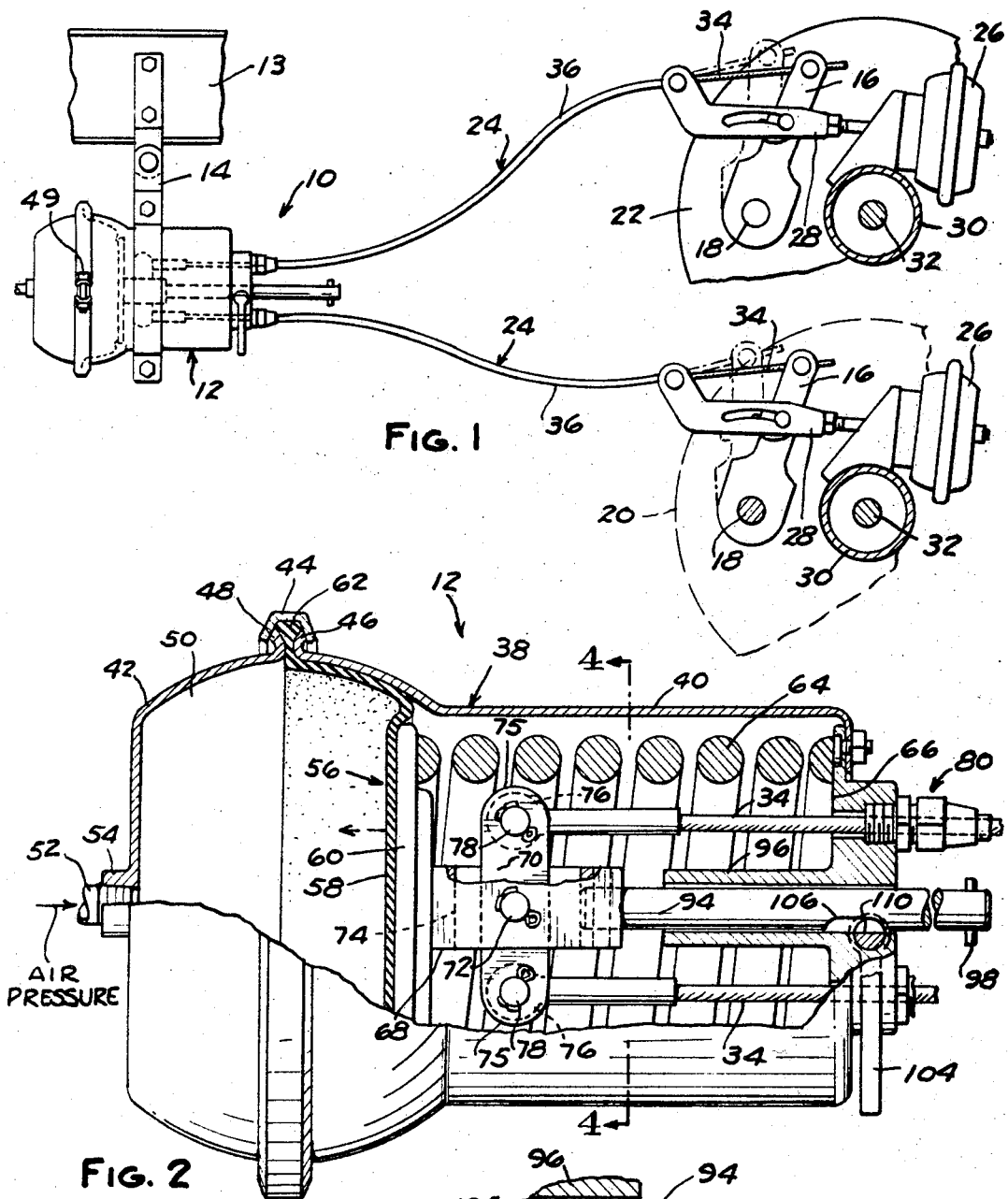

INVENTOR.
LLOYD D. MASSER
BY
Barnes, Kisselle, Raisch & Choate
ATTORNEYS

United States Patent Office 3,402,792
Patented Sept. 24, 1968

3,402,792
BRAKE ACTUATING APPARATUS
Lloyd D. Masser, Muskegon, Mich., assignor to Neway Equipment Company, Muskegon, Mich., a corporation of Michigan
Filed Jan. 3, 1967, Ser. No. 606,614
15 Claims. (Cl. 188—170)

ABSTRACT OF THE DISCLOSURE

A spring applied-fluid pressure released secondary air brake actuator, or pot, for applying a plurality of brakes. The actuator piston has a yoke pivotally mounted thereon with a brake cable connected on each end of the yoke. During brake actuation, the yoke pivots to equalize the braking force.

---

This invention relates generally to a brake actuating device for use on vehicles equipped with air-brake systems and more particularly to an auxiliary or emergency brake applying structure.

In air-brake systems, it is conventional to provide a primary air pot for applying and releasing the vehicle brakes under service conditions and it is also conventional to provide a secondary air pot which automatically applies the vehicle's brakes under emergency conditions such as where air pressure in the braking system is lost. The secondary pot can also be used for parking brake purposes; see Rager et al. 3,269,272.

In conventional systems, a separate secondary air pot has been used to actuate each individual brake. This is undesirable for three reasons. First, each secondary pot used adds directly to the cost of the vehicle. Second, in the type of vehicles which normally use air brakes, namely, commercial vehicles, the understructure is notoriously crowded with suspension and drive equipment as well as the air brake equipment and space is at a premium. Third, for every pound of weight added to a vehicle by the secondary air pots, the permissible pay load of the vehicle is diminished under the maximum load laws in existence in many states and communities.

The object of the invention is to provide a relatively simple, inexpensive brake applying structure which can be utilized to actuate not merely one brake but a plurality of brakes and to insure that the same amount of brake actuating force is applied to each of the brakes despite differences in slack adjustment which may exist between the brakes.

In general, the invention contemplates the use of an air pot having a piston movable by air pressure in one direction for releasing the brakes and movable in the other direction for applying the brakes under the urging of a spring when air pressure in the pot is relieved. Pivotally mounted on the piston is a yoke. A pair of brake cables are connected with the yoke, one on each side of the pivot. Each of the brake cables is connected with an individual brake. During one range of movement of the piston, the yoke pivots as necessary to enable the cables to take up different amounts of slack in the two brakes. Thereafter, upon continued movement of the piston and yoke, substantially like brake applying movements are imparted to the brake cables.

In the drawings:

FIG. 1 is a partly diagrammatic view illustrating the brake actuator of this invention in use.

FIG. 2 is an enlarged partly elevational view of the actuator with portions broken away and shown in section to illustrate structural details.

FIG. 3 is a fragmentary sectional view illustrating certain details of a locking device.

Figure 4:
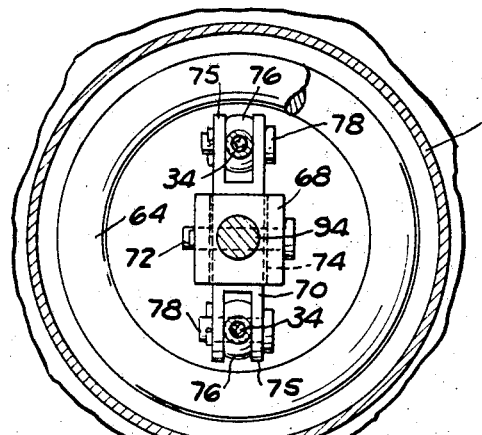
FIG. 4 is a sectional view on line 4—4 of FIG. 2.

Shown in FIG. 1 is a brake actuating apparatus 10 according to this invention which includes an air pot 12 mounted on a vehicle frame 13 by means of a bracket 14. Pot 12 is operatively connected with slack adjusting levers 16 mounted on the operating shafts 18 of the brakes for two separate wheels 20, 22 through cables 24. Slack adjusters 16 are operably connected to primary air pots 26 through linkage 28. Pots 26 are mounted on axle housings 30 which contain axle shafts 32.

Each cable 24 is conventional in structure, comprising an inner wire rope 34 slidable within an outer sheath 36 which is flexible but longitudinally substantially incompressible and typically made of coiled wire incased in rubber or the like. Wire ropes 34 are connected directly to slack adjusters 16 while sheaths 36 are anchored to pot 10 and to links 38.

Pot 12 comprises a housing 38 having a body 40 and a head 42 removably secured together by a clamp ring 44 engaged with peripheral flanges 46 and 48 on the body and head respectively. A bolt 49 (FIG. 1) constricts the clamp ring around the flanges. The clamp ring and flange structure is conventional. Head 42 and adjacent portions of body 40 define a chamber 50. Air under pressure is introduced and relieved from this chamber through an air line fitting 52 threaded into a nipple 54 on head 42.

A piston 56 is contained within pot housing 38. In the structure illustrated, piston 56 comprises a diaphragm 58 backed by a plate 60. The outer peripheral edge 62 of the diaphragm is sealingly clamped between flanges 46, 48 by clamp ring 44. A spring 64 is disposed in body 40 on the opposite side of piston 56 from chamber 50. This spring is compressed between plate 60 and an end wall 66 of body 40. Projecting from piston plate 60 is an extension or lug 68 to which a yoke bar 70 is pivotally mounted as at 72. In the device illustrated lug 68 is slotted at 74 and the yoke bar passes through the slot. The end portions 75 of the yoke bar are shown as being bifurcated (FIG. 2). Each wire rope 34 is provided with an eye 76 secured to the ends of the yoke by pins 78.

Each cable sheath 36 is anchored to end wall 66 of pot body 40 by means of a coupling 80. This coupling comprises a fitting 82 threaded into wall 66 and having an open center into which sheath 36 extends. The end of the sheath abuts a shoulder on the fitting as at 84. Sheath 36 passes through a ferrule 86 contained by an extension 90 on fitting 82 and a nut 92 threaded thereon. The fitting and nut have tapered portions engaged against similarly tapered end portions of the ferrule as at 93. When the ferrule is clamped longitudinally between the fitting and nut, the ferrule ends constrict around sheath 36 and prevent it from being pulled away from wall 66. Sheaths 36 may be secured to links 28 by similar couplings. A rod 94 is secured as by threading as to lug 68 and passes slidably through a guide tube 96 projecting inwardly from wall 66. This rod extends to the exterior of body 40 and is provided adjacent its end with a transverse pin 98 having portions which project laterally away from the rod (FIG. 2) and whose function is described below.

A rotatable pin 100 is disposed in an opening 102 in end wall 66. This pin is provided with a handle 104. Rod 94 has a recess 106 which is aligned with pin 100 when pot 12 is in the brakes-off condition of FIG. 2. Pin 100 has a portion 108 forming an obstruction and has a relieved portion or flat 110. Obstruction 108 can be projected into and withdrawn from recess 106 by turning handle 104.

In use, it may be assumed that the brake actuating apparatus 10 is mounted on frame 13 as shown with cables 24 operatively connected with slack adjusters 16 and links 28. During normal highway use, primary air pots 26 apply the brakes by swinging slack adjusters 16 counterclockwise as FIG. 1 is viewed. When the force exerted by the primary air pots is relieved, the slack adjusters swing clockwise under spring force within the brake mechanisms to release the brakes. Cables 24 flex to facilitate substantially unimpeded operation of the brakes in this manner by pots 26.

Secondary pot 12 can be mounted at any convenient location on the vehicle and in any convenient attitude. For example, pot 12 could be disposed at an angle of 90° in any direction from the direction illustrated or 180° if that should be necessitated by space considerations.

During normal highway use, secondary pot 12 is in the condition illustrated in FIG. 2. Air under line pressure is in chamber 50 and piston 56 has been moved to the right as the drawing is viewed, thereby compressing spring 64. Lug 68 and yoke 70 have been moved to the right by piston 56 and no brake applying force is being exerted on wire ropes 34.

Pot 12 applies the brakes whenever pressure in chamber 15 is relieved either accidentally or purposefully. In either event, when pressure in chamber 50 is relieved piston 56 is forced to the left as the drawing is viewed by spring 64, carrying lug 68 and yoke 70 with it. Yoke 70 also draws wire ropes 34 to the left as the drawing is viewed. It frequently occurs that the brakes for wheels 20, 22 have different amounts of slack. For example, the brake for wheel 22 may begin to apply after its slack adjuster 16 moves only about a half inch while the brake for wheel 20 may not begin to apply until after its slack adjuster has moved about an inch. A typical difference in slack adjustment is represented in FIG. 1 by the different dotted line positions of slack adjusters 16, these positions representing the positions at which the two brakes begin to apply.

Under the condition illustrated, during the initial movement of the piston 56 to the left, both wire ropes 34 will move uniformly with the piston until the brake slack for wheel 22 is taken up. Upon continued movement of the yoke, this rope will be stopped while the other rope remains free to continue until the brake slack for wheel 20 is also taken up. During this continued movement, yoke 70 swings counterclockwise about its pivot 72, thereby accommodating differential amounts of movement of the two wire ropes incidental to the differential slack in their respective brakes.

Thereafter, upon further leftward movement of piston 56 and yoke 70, both wire ropes 34 are moved to the left through the same distance and thereby swing slack adjusters 16 counterclockwise to the same extent and apply the same amount of brake force to wheels 20, 22. When air under pressure is again introduced into chamber 50, piston 56 is returned toward the right to the position shown in FIG. 2, the tension is relieved in wire ropes 34, the slack adjusters return to the solid line positions of FIG. 1, and the brakes for wheels 20, 22 are thereby relieved.

If pressure should be lost from the air brake system during highway operation so that insufficient pressure is available to operate primary pots 26, pressure is also lost from chamber 50 and secondary pot 12 functions in the manner described to provide an emergency brake actuator. When the vehicle is parked, air can be valved out of chamber 50 by suitable controls so that secondary pot 12 can be used as a parking brake actuator. In addition, if the brakes should be subjected to a severe braking operation during highway use resulting in brake fade, secondary pot 12 can be used as an auxiliary brake actuator to swing slack adjusters 16 counterclockwise beyond the range of movement by pots 26 and links 28, this movement being permitted by the illustrated pin and slot connection between the slack adjusters and links 28. This particular feature is disclosed in greater detail in Rager et al. 3,144,812.

The brake applying force and the reaction thereto are contained by secondary pot itself and no such force is transmitted to vehicle frame 13 through bracket 14. Therefore, the bracket need be no heavier than necessary to support the weight of the secondary pot itself in its desired position.

In some situations as where a vehicle is being transported piggy-back on a railroad flatcar, it is desirable to leave the vehicle brakes off rather than having them set. In such situations, it is desirable to immobilize secondary pot 12 so that it cannot apply the brakes. To accomplish this, handle 104 is rotated counterclockwise from the FIG. 2 position wherein the recess 106 is aligned with pin 100. This rotates projection 108 into the recess (FIG. 3) and locks rod 94, lug 68, and piston 56 against movement into the left under the action of spring 64. To unlock the secondary pot, handle 104 is swung clockwise to withdraw projection 108 from recess 106, thereby aligning flat 110 with the recess and freeing piston 56 for brake applying movement under the action of spring 64.

Figure 6:
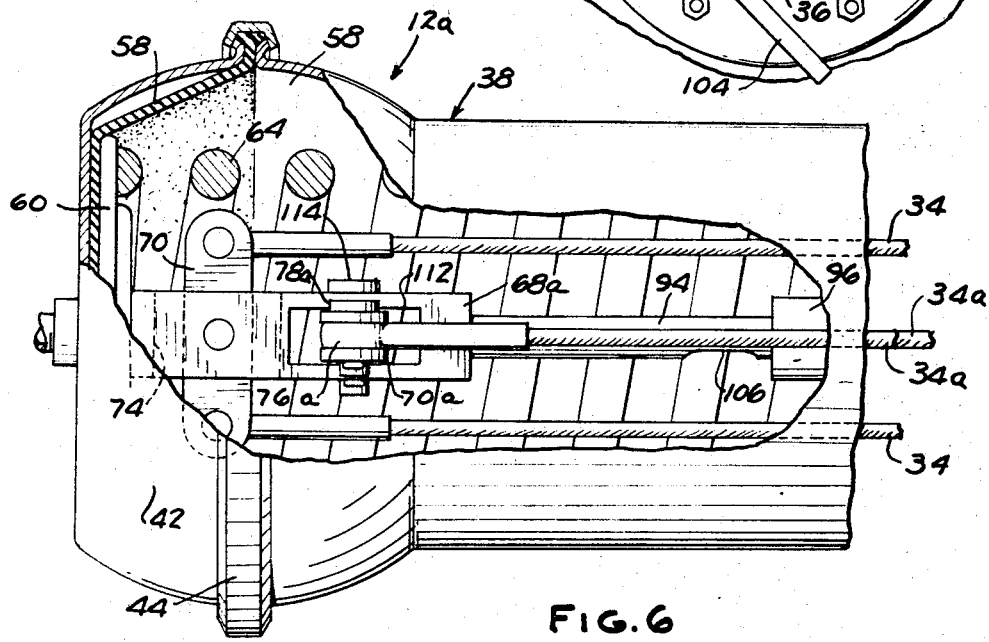
FIG. 6 is a fragmentary view generally similar to FIG. 2 but showing a modified form of the invention.
Figure 5:
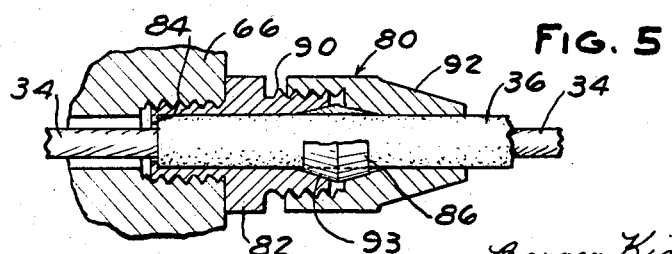
FIG. 5 is an enlarged framentary sectional view illustrating a cable coupling.

For servicing purposes, it is sometimes desirable to remove head 42 from body 40 of the secondary pot housing. At the same time for safety purposes it is necessary to contain spring 64 so that it will not propel piston 56 or related parts out of the open end of the pot housing with explosive force. When pressure is relieved in chamber 50, piston 56 moves into abutment with head 42 as illustrated in FIG. 6. At the same time, pin 98 engages against the outside of wall 66 and thereby obstructs further movement of the piston to the left. Head 42 may then be safely removed by loosening bolt 49 and expanding ring 44 to clear flanges 46, 48. If further disassembly of the secondary pot is required, suitable means can be assembled to piston 56 and pot housing 40 to contain the remaining stress in spring 64 and relieve it gradually after pin 98 is removed from rod 94. Reassembly of pot 12 is accomplished by a reverse procedure.

With conventional cable attachments, cables 24 would tend to buckle adjacent their anchor points to wall 66 and links 28. This results from the fact that the cables flex during actuation of the brakes and by the fact that cable sheaths 36 are under compression when secondary pot 12 is used to apply the brakes. However, couplings 80 laterally support the cables for a sufficient distance along their length to substantially eliminate this tendency to buckle.

Figure 7:
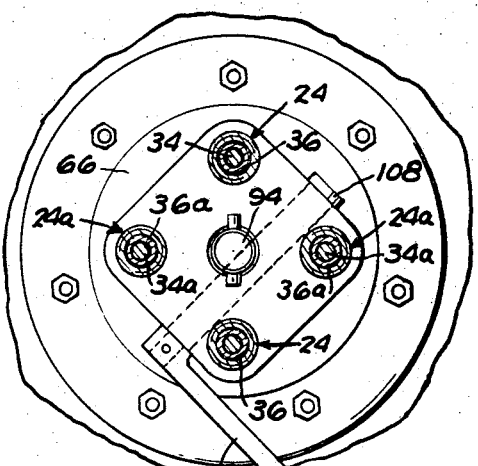
FIG. 7 is an end view of the modified form of the invention.

The modified form of the invention shown in FIGS. 6 and 7 is, in general, similar to that described above except that secondary pot 12a is arranged to actuate the brake cables for four separate brakes instead of two. Lug 68a on piston plate 60 is extended and contains a second slot 112 disposed at right angles to slot 74. A second yoke bar 70a is pivotally mounted in slot 112 at 114. A second pair of wire ropes 34a are secured to the opposite ends of yoke bar 70a by eyes 76a and pins 78a in the same manner that wire ropes 34 are connected to yoke 70. Cables 24a are connected between pot 12a and the brakes for a second set of wheels (not shown) in the same manner as cables 24 are connected with the brakes for wheels 20 and 22. Cables 24a and yoke 70a cooperate in the same manner as cables 24 and yoke 70 to take up differential slack in their respective brakes and then apply substantially equal braking force to the brakes with which they are connected.

What is claimed is:
1. Brake actuating apparatus which comprises,
   motor means having a movable motor member and housing means effective to contain motive forces operable to move said member in different directions,
   a plurality of brake force transmitting elements mounted on said motor means and each being constructed and arranged to be connected in actuating relation to an individual brake on a vehicle with which said apparatus is adapted to be used, yoke means mounted for movement by said motor member and having portions which are movable relative to each other, one of said elements being connected in force transmitting relation with one of said portions and another of said elements being connected in force transmitting relation with another of said portions, said portions upon one range of movement of said yoke being relatively movable responsive to unlike movements of said elements incidental to unlike slack take-up in their respective brakes, said yoke upon continued movement thereof beyond said range being operative to impart substantially like movement to said elements whereby to cause substantially like actuation of brakes with which said elements are connected.

2. The apparatus defined in claim 1 wherein said yoke comprises a bar mounted for swinging movement on said motor member.

3. The apparatus defined in claim 2 wherein said bar is pivoted on said motor member and said portions thereof are disposed on opposite sides of the pivot.

4. The structure defined in claim 1 wherein said housing means has locking means mounted for movement thereon between one position in which it provides an obstruction to movement of said motor member and to another position in which it is free of said motor member whereby selectively to immobilize and release said apparatus for brake actuation.

5. The apparatus defined in claim 4 wherein said motor member has a longitudinal extension which passes through an opening in said housing means, said locking means being mounted adjacent said opening.

6. The apparatus defined in claim 5 wherein said extension has a recess which in one position of said motor member is aligned with said locking means, said locking means comprising a rotatable pin which in one rotative position has a portion projecting into said recess when the latter is aligned therewith to provide said obstruction and which in another rotative position is withdrawn from said recess to free said motor member for movement.

7. The apparatus defined in claim 4 wherein said motor member has a longitudinal extension, said yoke means comprising a bar pivoted on said extension, said bar having portions disposed on opposite sides of the pivot forming said portions of said yoke means, said housing means and extension being provided with means cooperable to form said locking means.

8. The apparatus defined in claim 7 wherein spring means is stressed between one side of said motor member and said housing means to provide motive force for said member in one direction, said housing means having a removable head adjacent the other side of said member, said extension having a projection which provides a second obstruction effective when said locking means is released to limit movement of said motor member in said one direction and thereby being operative to contain said member against being propelled out of said housing means under the force of said spring means when said head is removed.

9. The apparatus defined in claim 1 wherein each of said elements comprises a cable slidably contained in a flexible longitudinally substantially incompressible sheath, said cables being so mounted on said motor means and connectable with individual brakes, each of said cable sheaths being secured to said housing means by a coupling which comprises a fitting on said housing means having a socket within which said sheath fits, a ferrule around said sheath having an end abutted against said fitting and a nut surrounding said ferrule and threaded onto said fitting, said nut being abutted against the other end of said ferrule, said ferrule being constricted against said sheath by the longitudinal force exerted thereon by said fitting and nut.

10. The apparatus defined in claim 1 wherein said housing means defines a fluid pressure chamber and said motor member comprises a piston therein movable in one direction under the influence of fluid under pressure in said chamber, spring means contained between said piston and housing means, said spring means being stressed to urge said piston toward movement in the other direction, said piston having a central extension, said yoke means comprising a bar pivotally mounted on said extension and having portions disposed on opposite sides of the pivot with which said elements are respectively connected, each of said elements comprising a cable slidably contained in a flexible longitudinally substantially incompressible sheath, each sheath having an end portion fixedly mounted on said housing means.

11. The apparatus defined in claim 1 wherein there are no more than two of said elements, said yoke means comprising a single yoke having portions with which said elements are so connected.

12. The apparatus defined in claim 1 wherein said yoke means comprises two separate yokes, there being four of said elements two of which are so connected with portions of one of said yokes and the other two of which are so connected with portions of the other of said yokes.

13. The apparatus defined in claim 12 wherein said motor member has a longitudinal extension, said yokes being mounted for swinging movement in different planes on said extension.

14. The apparatus defined in claim 13 wherein said yokes comprise bars pivotally mounted on said extension, the pivots being spaced longitudinally of said extension and the axes thereof extending in different directions.

15. The apparatus defined in claim 14 wherein the pivot axes are substantially perpendicular to each other.

References Cited

UNITED STATES PATENTS

| | | | |
|---|---|---|---|
| 2,131,459 | 9/1938 | Weatherhead | 188—204 X |
| 3,198,086 | 8/1965 | Rager et al. | 188—106 X |

DUANE A. REGER, *Primary Examiner.*